Nov. 23, 1954
L. HUBER ET AL
2,695,053
INTERMITTENT COMBUSTION DEVICE PROVIDED WITH MEANS
FOR CONTROLLING THE COMBUSTION GAS FLOW THEREIN
Filed June 7, 1950
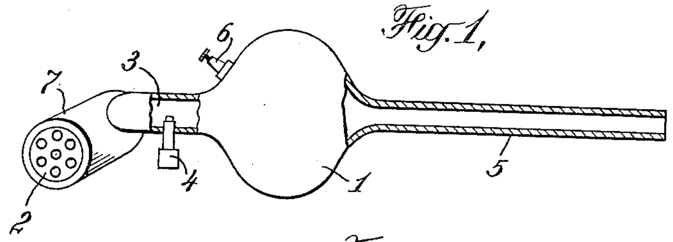
Fig. 1,
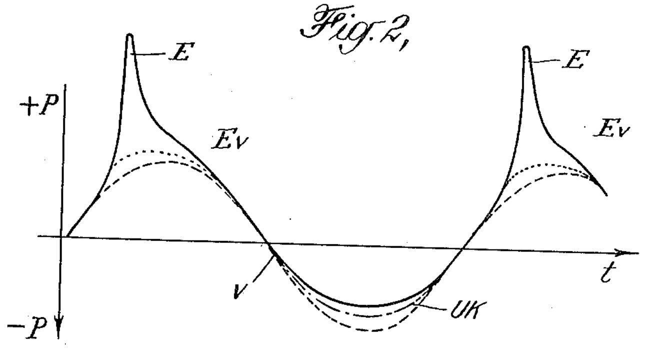
Fig. 2,
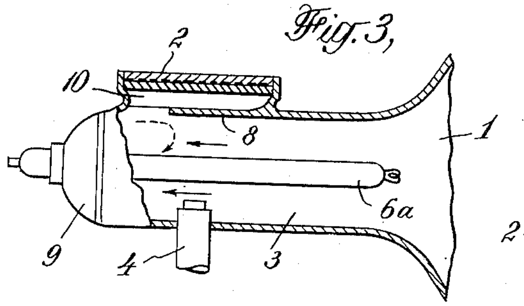
Fig. 3,
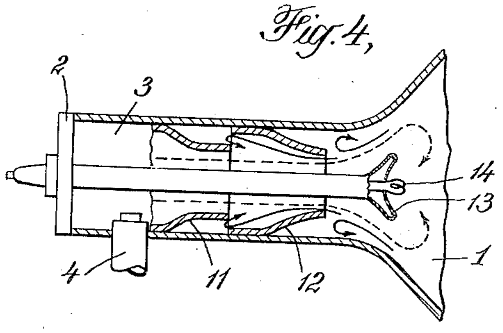
Fig. 4,
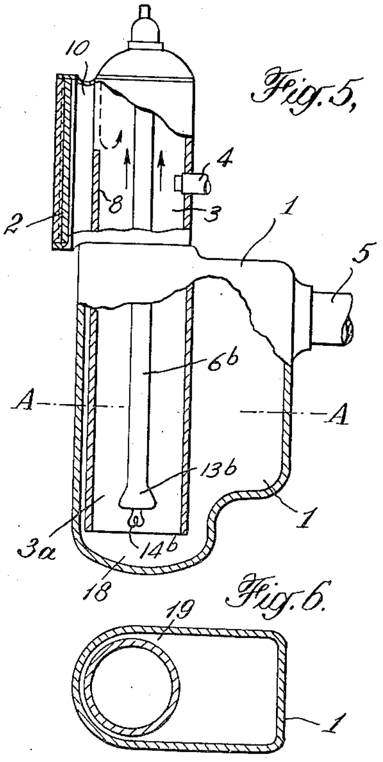
Fig. 5, Fig. 6.
INVENTORS
LUDWIG HUBER, &
WALTER DÜRR.
BY
Pennie, Edmonds, Morton, Barrows & Taylor
ATTORNEYS

United States Patent Office 2,695,053

Patented Nov. 23, 1954

2,695,053

INTERMITTENT COMBUSTION DEVICE PROVIDED WITH MEANS FOR CONTROLLING THE COMBUSTION GAS FLOW THEREIN

Ludwig Huber and Walter Dürr, Uberlingen, Germany, assignors, by mesne assignments, to Swingfire (Bahamas) Limited, Nassau, Bahamas, a corporation of the Bahamas Application June 7, 1950, Serial No. 166,612

Claims priority, application Germany June 13, 1949

8 Claims. (Cl. 158—4)

This invention relates to intermittently firing combustion devices having a combustion chamber forming with a valveless exhaust duct a Helmholtz resonator which is excited by combustion cycles produced in phase with its resonance frequency, air for fresh fuel charges being admitted during the decompression or suction cycles through an inlet check valve for admixture with corresponding fuel charges and combustion thereof during the succeeding compression cycles. The particular object of the invention is to provide in such devices means for controlling the combustion gas flow to protect the inlet valve thereof.

Combustion devices of the type indicated above are applicable for heating purposes and must operate with a safety factor which exceeds the requirements for electric heaters or gas heaters. It was difficult heretofore to meet in such a device the requirement for safe and reliable operation under varying pressure and temperature conditions, because of considerable thermal and mechanical stresses which are placed on its inlet check valve. Such a check valve must be lightweight in order to operate and to open with certainty in response to the relatively slight pressure differences which periodically occur in the combustion chamber, and yet it must withstand the strain of operation at technically uncommon frequencies, since it must accurately open and close, for example, 180,000 times per hour, if we assume a resonance frequency of 50 cycles.

Endeavors were therefore made in the past to employ pressure variations affecting the inlet check valve which were chosen as great as possible in order to have available correspondingly great control forces. The valve was for these reasons positioned within a short, thick inlet duct, as close as possible to the combustion chamber.

The invention is based on the recognition of the fact that operating safety can be increased and the life of such devices lengthened by interposing between the inlet check valve and the combustion chamber a pneumatic protective cushion which functions as a turbulence zone and keeps the combustion flame away from the valve. This fact is exceedingly surprising, since the interposition of such a turbulence zone could at first be expected to reduce the effect of the control forces acting on the valve, therefore calling for valve bodies of still lighter and more mobile structure than before. The reason for the improvement which was obtained by the provision of such a "turbulence cushion" is believed to reside in the fact that the cushion acts in the nature of a damper for the pressure impacts of the combustion cycles in their repercussion on the valves. The damping by the "turbulence cushion" is also believed to be superior to any other damping, because it also operates as a dynamic dam blocking access of the combustion flame to the valve and acting further as an aperiodic resistance which cannot give rise to any disturbing coupling oscillations, as might be caused, e. g., by mechanical means forming an elastic cushion for the combustion pressure impact.

The turbulence zone serving as a pneumatic cushion is produced, in accordance with the invention, by the provision of control means for creating suitable patterns for the internal fluid flow. All pertinent experience and knowledge gathered in fluid mechanics may be drawn upon in order to achieve the ends contemplated by the invention, namely, to operate so that the flow of the harsh combustion impact coming from the combustion chamber is intercepted and deflected by the braking force of a turbulence resistance which is much greater than the resistance to the flow of the incoming fresh air to the combustion chamber.

The desired results may be obtained by the provision, in the channel formed by the inlet of the burner, of simple, preferably unsymmetrical turbulence-producing means or choke chamber. This means is unsymmetrical in the sense that it causes within the inlet channel a relatively small flow resistance to incoming fluid flowing at average velocity in the direction of the combustion chamber while causing a very high flow resistance to fluid passing at high velocity in the opposite direction. So-called "fluid-flow-rectifiers" show this characteristic to a high degree.

Among these rectifiers, the one known as the "Thoma-choke" was found suitable for the purposes of the invention. It comprises a cylindrical choke chamber provided with axial and tangential conduits. A current introduced into such choke chamber in axial direction passes therethrough practically without hindrance, while the force of a current introduced tangentially is dissipated by gyrating peripherally of the cylindrical chamber. A "turbulence cushion," which will suffice in many cases, may also be produced by disposing the valve chamber on the side of the inlet channel. It is also possible to create the "turbulence cushion" at the inner end of the inlet channel by terminating the channel in a pocket formed in the combustion chamber.

The invention will be described below more in detail with reference to the accompanying drawings showing in schematic manner various embodiments thereof. In these drawings, Fig. 1 shows in diagrammatic elevational view and partly in section a device made in accordance with the invention, comprising a so-called "Thoma-choke" disposed between the inlet valve and the burner chamber;

Fig. 2 is a diagram to aid in explaining the pressure conditions in the combustion chamber in relation to time;

Fig. 3 indicates a fractional diagrammatic view of a combustion device, partly in section, comprising valve means disposed on the side of the inlet duct;

Fig. 4 illustrates a fractional diagrammatic view, partly in section, of an embodiment having flow control means disposed within the channel of the inlet;

Fig. 5 illustrates a form of the invention showing, in partly elevational and partly sectional diagrammatic view, a device in which the channel of the inlet terminates in a pocket of the combustion chamber; and Fig. 6 shows a diagrammatic transverse section taken approximately along lines A—A of Fig. 5.

Like parts are indicated in the drawings by like reference numerals. Known details and elements will be referred to only to the extent required for describing the various features of the invention.

The sequence of the operations will now be explained with reference to Figs. 1 and 2.

The device shown in Fig. 1 comprises the combustion chamber 1 to which is admitted air through the inlet check valve 2 disposed remote from the combustion chamber at the free end of the inlet mixing duct 3. Numeral 4 indicates a fuel inlet nozzle, and 5 indicates the exhaust duct, i. e., a duct which is directly connected with the burner chamber without the interposition of a valve. The exhaust duct 5 and the burner chamber 1 form a Helmholtz resonator with definable resonance frequency. The device may be built so that the resonance frequency lies within a range, for example, within 50–200 cycles.

The combustion chamber is initially filled with a suitable fuel mixture, for example, by means of a hand pump. This first fuel charge is ignited by the spark plug 6. The compression of the gases within the combustion chamber 1 incident to the combustion of the first fuel charge causes closing of the inlet check valve 2. The invention protects the check valve against the impact of the pressure peak of the hot combustion gases. The compression of the gases also drives the exhaust gases to the right of the combustion chamber through the exhaust duct 5. The accelerated exhaust of these gases creates within the combustion chamber a low pressure or partial vacuum, thus causing opening of the inlet check valve 2 to admit by suction fresh air and also injection of a fresh fuel charge through the nozzle 4. The resulting fuel mixtures passes, on its way to the combustion chamber, through the channel formed by the inlet mixing duct 3.

The suction also affects the residual gas plug in the exhaust duct 5, causing the residual gas plug to react and to swing back, moving due to its inertia inwardly with increasing velocity. The fresh fuel charge supplied to the combustion chamber, as described above, is ignited by the hot gas particles of the reacting gases when such reacting gases enter the combustion chamber.

The operation is periodically repeated. The frequency of the ignitions or, rather, the combustions, is determined by the frequency of the combustion chamber and the exhaust duct acting as a resonator. The frequency is affected by the density, depending on the temperature, of the gas plug in the exhaust tube 5 and may therefore show considerable fluctuations.

Fig. 2 shows the pressure conditions in the combustion chamber incident to an oscillation cycle. Superposed on the dotted sine curve of a pure resonance oscillation of the Helmholtz resonator 1, 5 is the steep pressure rise E caused by the combustion of the fuel charges, while the decay during the decompression or suction phase is damped from the moment of the opening of the inlet valve V by the fresh gas stream entering the combustion chamber.

A "turbulence cushion" in the form of a "Thoma-choke" may be provided ahead of the inlet check valve 2 which is diagrammatically indicated in Fig. 1. The choke comprises a cylindrical chamber 7 carrying in one end wall the inlet check valve 2, the channel of the inlet mixing duct 3 coming from the combustion chamber terminating tangentially in the cylindrical side of the choke chamber 7, as shown. The pressure impacts E (Fig. 2), which move away from the combustion chamber in the direction of the choke, therefore create within the choke chamber 7 a gyrating turbulence along its cylindrical wall, and are thus dissipated without fully affecting the valve 2. The pressure rise which affects the valve corresponds approximately to the pressure rise $E_v$ indicated in Fig. 2. In the inlet direction, the flow resistance of the choke is very small, since fresh air enters into the cylindrical choke chamber 7, during the succeeding suction phase, in an axial direction. The branch of the curve lying underneath the zero line, as shown in Fig. 2, therefore is not noticeably changed, and affects the check valve normally.

The operation results in a damping of the peak E of the pressure impact acting on the valve 2 and such damping reduces very appreciably the mechanical stresses thereon, thus lengthening the life of the valve 2 and benefitting safe and reliable performance.

A similar effect is obtained in the structure shown in Fig. 3. The inlet check valve 2 is in this case disposed in a side channel 10 forming a choke chamber and opening transversely into the side of the inlet mixing duct 3 and with the opening protected by a tongue or baffle 8 against direct impact by the reacting combustion pressure flow from the combustion chamber. The "turbulence cushion" is created within the preferably concave closure cap 9 of the inlet mixing duct 3, as indicated by the dotted arrow. This cushion is positioned ahead of the valve channel 10 and keeps the combustion pressure peak E (Fig. 2) away from the valve. A glow plug 6a takes, in this embodiment, the place of the spark plug 6 shown in Fig. 1.

The structure illustrated in Fig. 4 accomplishes the purposes of the invention by a similar operation using, however, totally different flow-control means. They comprise the centrally disposed deflecting body 13 flared outwardly in the direction of the combustion chamber and the inwardly tapered funnel-shaped tubular baffles 11, 12 positioned within the inlet duct 3. The tapered ends of the baffles form choke chambers laterally connected to the inlet duct. The arrangement causes damping of the pressure impact E (Fig. 2) coming from the burner chamber 1, by creation of turbulence in the direction of the full-line arrows, while the fresh air stream coming subsequently from the valve 2 passes inwardly practically without hindrance, as indicated by the dotted arrows.

The centrally disposed deflecting body 13 may be used as a carrier for the incandescent glow coil 14 which may be electrically heated for the ignition of the initial fuel charge, being thereafter held at ignition temperature by the succeeding periodic combustion cycles. The deflecting body 13, being disposed between the inlet and valve 2 and the combustion chamber 1, guides the flow of the incoming fuel charge (dotted arrows) away from the incandescent glow coil 14, the reacting exhaust gases then acting to crowd the fuel charge in the direction of the glow or incandescent coil in order to cause ignition thereof in phase-correct relationship, at the moment when the exhaust gases enter the combustion chamber.

The embodiment described above, particularly with reference to Fig. 4, yield a particular advantage. Considerable amounts of heat are transferred by the reacting combustion gases to the flow-control bodies 11, 12, and 13, respectively, and the heat is subsequently transferred to the cool incoming fresh fuel charges, preheating such charges for ready reaction and ignition. The structure also increases the flow resistance in the inlet direction and therefore decrease the damping of the decay of the compression phase so that the decompression phase in the burner chamber takes approximately the dot-dash curve UK shown in Fig. 2, which is more nearly approximated to the sine curve of the pure resonance oscillation.

The "turbulence cushion" may also be created, in accordance with the invention, as indicated in Fig. 5. The inlet duct is in this case provided with tubular extension 3a projecting free of the walls thereof into the combustion chamber 1 so that its opening reaches into a pocket 18 formed in the chamber where the gases are subjected to a dynamic damming action. The "turbulence cushion" is created incident to the combustion of a fuel charge ahead of and within the terminal end of the inlet extension 3a.

In this form of the invention, the first fuel charge may be ignited by a glow plug 6b having an incandescent glow coil 14b at its inner end similar to the glow plug and glow coil of Fig. 4. The inner end of the glow plug, immediately back of the glow coil, is formed with a deflecting or flow control enlargement 13b which functions in a manner similar to the flow deflecting body 13 of Fig. 4. The "turbulence cushion" may be further augmented, if desired, by the use of flow-control bodies such as 11 and 12, as shown in Fig. 4. In order to avoid overheating of the inlet extension 3a and escape from combustion of the layers of the fresh fuel charge, which are oriented ahead of its open end, the extension is preferably disposed within a niche or bay 19 of the combustion chamber 1, as is particularly shown in Fig. 6, so that only a portion of its walls is fully washed by the hot combustion gases.

Whichever of the above described structures may be employed in any given case, there will always be created a "turbulence cushion" between the combustion chamber and the inlet valve which depresses the full effect of the pressure peak E (Fig. 2) and prevents it from becoming fully effective on the valve.

Changes may be made within the scope and spirit of the appended claims.

We claim:

1. In an intermittently firing combustion device comprising means forming a combustion chamber, an exhaust duct connected to and extending from said combustion chamber and forming therewith an acoustic resonator, an inlet mixing duct provided with air intake means and communicating at its outlet and with said combustion chamber, said air intake means including a choke chamber laterally connected to the inlet mixing duct adjacent the outer end thereof remote from said combustion chamber and an inlet check valve opening into said choke chamber, and means for introducing fuel into the inlet mixing duct at a point, along the path of flow of air therethrough, between the connection of the choke chamber with the inlet mixing duct and the combustion chamber.

2. A device according to claim 1, further characterized in that the inner part of the inlet mixing duct projects into the combustion chamber free of the walls of such chamber and terminates within the combustion chamber.

3. A device according to claim 2, further characterized in that the combustion chamber is provided with a bay into which the inner end of the inlet duct extends, whereby said inner duct end is partly shielded from the combustion gases in the combustion chamber.

4. A device according to claim 2, further characterized in that the combustion chamber is provided with a pocket in the wall thereof into which the inner end of the inlet duct extends.

5. A device according to claim 2, further characterized in that the exhaust duct is connected laterally to the combustion chamber at a substantial angle to the inner part of the inlet duct.

6. A device according to claim 1 in which the choke chamber comprises a cylindrical chamber with the inlet valve opening axially into one end thereof and the inlet duct opening tangentially into the side thereof.

7. A device according to claim 1 in which the choke chamber comprises a side channel connected laterally to and opening into the side of the inlet duct, and a baffle is provided closing that part of the connecting opening in the inlet duct which is nearest the combustion chamber, the inlet check valve being disposed in the side channel.

8. A device according to claim 1, further characterized by the provision of a flow deflecting body in the inlet duct and ignition means carried by the flow deflecting body between said body and the combustion chamber, said flow deflecting body guiding incoming gases flowing toward the combustion chamber around said ignition means and causing turbulent flow of gases flowing toward the inlet check valve.

References Cited in the file of this patent

UNITED STATES PATENTS

| Number | Name | Date |
|---|---|---|
| 2,286,854 | Holthouse | June 16, 1942 |
| 2,412,825 | McCollum | Dec. 17, 1946 |
| 2,414,828 | McCollum | Jan. 28, 1947 |
| 2,496,351 | Mazzoli | Feb. 7, 1950 |
| 2,523,308 | Kemmer et al. | Sept. 26, 1950 |
| 2,523,378 | Kollsman | Sept. 26, 1950 |
| 2,523,379 | Kollsman | Sept. 26, 1950 |
| 2,525,782 | Dunbar | Oct. 17, 1950 |
| 2,526,645 | Edelman | Oct. 24, 1950 |
| 2,574,460 | Bohanon | Nov. 13, 1951 |
| 2,581,902 | Bodine | Jan. 8, 1952 |

FOREIGN PATENTS

| Number | Country | Date |
|---|---|---|
| 386,908 | Great Britain | Jan. 26, 1933 |
| 424,955 | Great Britain | Dec. 1, 1933 |